(12) United States Patent
Pol

(10) Patent No.: US 12,054,854 B2
(45) Date of Patent: Aug. 6, 2024

(54) METHOD OF PRODUCING AMORPHOUS CARBON FIBERS, CARBON FIBERS MADE THEREFROM AND ANODES MADE THEREFROM FOR USE IN ELECTROCHEMICAL CELLS

(71) Applicant: Purdue Research Foundation, West Lafayette, IN (US)

(72) Inventor: Vilas Ganpat Pol, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 492 days.

(21) Appl. No.: 17/488,246

(22) Filed: Sep. 28, 2021

(65) Prior Publication Data

US 2022/0259772 A1    Aug. 18, 2022

Related U.S. Application Data

(63) Continuation-in-part of application No. 16/773,870, filed on Jan. 27, 2020, now Pat. No. 11,539,040.

(60) Provisional application No. 62/798,081, filed on Jan. 29, 2019.

(51) Int. Cl.
   *C08F 8/36*     (2006.01)
   *C08F 10/02*    (2006.01)
   *D01F 9/24*     (2006.01)

(52) U.S. Cl.
   CPC ............... *D01F 9/24* (2013.01); *C08F 8/36* (2013.01); *C08F 10/02* (2013.01); *D10B 2101/12* (2013.01)

(58) Field of Classification Search
   None
   See application file for complete search history.

(56) References Cited

U.S. PATENT DOCUMENTS

2007/0181859 A1 * 8/2007 Inagaki ............... C08G 64/42
                                                      525/333.5
2009/0306295 A1 * 12/2009 Mays .................. C08J 5/2268
                                                      525/185

* cited by examiner

*Primary Examiner* — Wyatt P McConnell
(74) *Attorney, Agent, or Firm* — Purdue Research Foundation

(57) ABSTRACT

A method of producing a sulfonated polymer. The method includes providing a source for a quantity of a polymer containing polymer fibers. The quantity of the polymer is heated while immersed in sulfuric acid to 100-200° C. for a period time in a closed reactor containing an atmosphere and capable of holding pressure generated by a reaction between the quantity of the polymer and the sulfuric acid resulting in a sulfonated polymer, wherein substantially all the quantity of the polymer from the source is converted into sulfonated polymer. The sulfonated polymer is then removed from the reactor and dried. An electrode suitable for use as an electrode in an electrochemical energy storage cell is disclosed. The electrode contains amorphous porous carbon fibers made from a sulfonated polymer with a morphology wherein the amorphous porous carbon fibers have the morphology of the sulfonated polymer from which they are made.

21 Claims, 13 Drawing Sheets

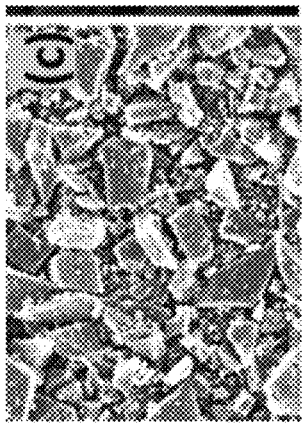
FIG. 2A
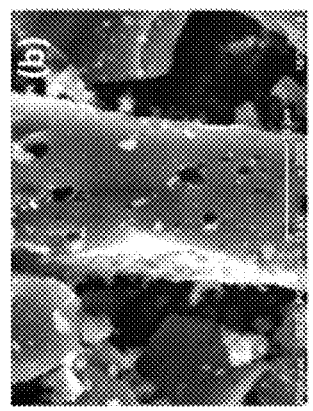
FIG. 2B
FIG. 2C
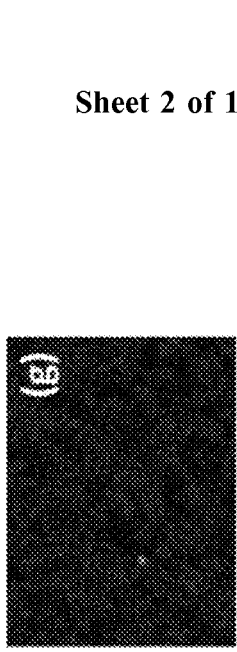
FIG. 2D
FIG. 2E
FIG. 2F
FIG. 2G
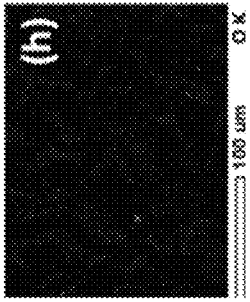
FIG. 2H

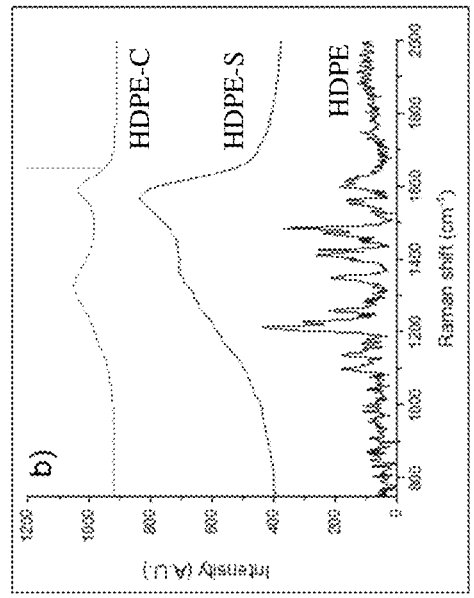
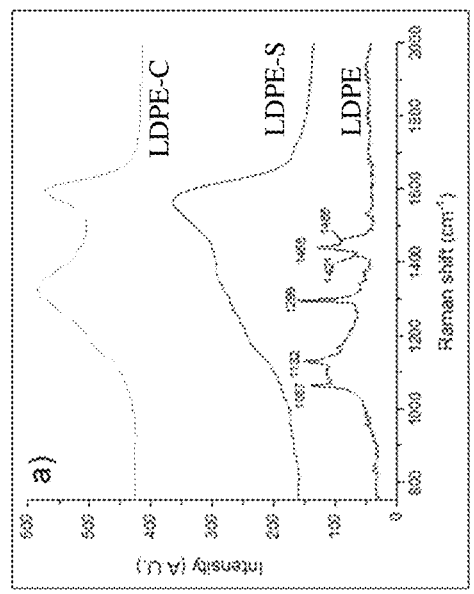
FIG. 3A
FIG. 3B

METHOD OF PRODUCING AMORPHOUS CARBON FIBERS, CARBON FIBERS MADE THEREFROM AND ANODES MADE THEREFROM FOR USE IN ELECTROCHEMICAL CELLS

CROSS-REFERENCE TO RELATED APPLICATIONS

The present U.S. patent application is a continuation-in-part patent application of U.S. patent application Ser. No. 16/773,870 filed Jan. 27, 2020, [which claims the benefit of U.S. Provisional Application No. 62/798,081 filed Jan. 29, 2019. The contents of these] prior applications are incorporated in their entirety herein by reference.

TECHNICAL FIELD

The present disclosure generally relates to producing amorphous, porous carbon fibers from polyethylene, especially from waste materials, such that the carbon fibers are suitable as carbon anodes in electrochemical cells, especially lithium-ion batteries. The carbon fibers also find application in enhancing mechanical strength of materials, among other applications.

BACKGROUND

This section introduces aspects that may help facilitate a better understanding of the disclosure. Accordingly, these statements are to be read in this light and are not to be understood as admissions about what is or is not prior art.

Globally, around 300 million tons of plastic were produced in 2013 to fulfill the growing demand for them. Soon after use, most of the used plastic (>85%) makes its way to landfill and oceans, where it takes hundreds of years to decompose into small fragments. As plastic slowly degrades with sunlight, it becomes smaller and starts releasing toxic chemicals into the environment. This approach disturbs our ecosystem. It has been estimated that at least 5.25 trillion plastic particles weighing around 269,000 tons are submerged or floating in the sea. Currently, an unsustainable trend is that waste plastics are shipped for recycling to countries with lower environmental standards. However, this approach is not economical, appealing, or benign for our environment and overall ecosystem.

Typically, closed-loop recycling approach is used in most thermoplastics because energy recovery from plastics is very poor, requires air emission controls and byproduct ash could be hazardous. However, polyethylene (PE) with colorants, dyes, labels, and sticky additives increases the difficulty in recycling. PE has been proposed for more than four decades as a low cost (1 $/kg) carbon precursor with high (86%) carbon content. In 1972, some researchers pyrolyzed saturated chlorinated polyethylene to obtain carbon. Other researchers produced carbon fibers using ultra-high molecular weight polyethylene reacting with $H_2SO_4$ acid at 180° C. followed by carbonization in He atmosphere at 1100° C., yielding 55 wt. % carbon fibers. Recently, some researchers prepared microporous carbon with high-density polyethylene (HDPE) using $H_2SO_4$ at 120° C. and carbonization at 1150° C. under $N_2$ atmosphere, obtaining 51.9 wt. % yield. However, in many of these methods carbon was produced in limited quantities without potential applications.

Hydrothermal carbonization is known to produce carbonaceous materials from biomass precursors using water. Due to self-generated pressures at low temperatures in a hydrothermal system, it resembles the natural process of coal formation. Previously, dry autoclaving of PE (thermolysis under self-generated pressure at elevated temperature in a closed system) produced solid, dense, low surface area functional carbon spheres. These obtained carbon spheres were studied as lithium-ion battery anodes, sodium ion battery anodes and as lubrication additives. PE is also remediated into carbon nanotubes via dry autoclaving. Typically, carbonaceous materials are synthesized from hydrocarbons through expensive and complex multistep processes, with the special requirement of plasma and reducing gasses becoming complicated to scale-up.

Thus there exists an unmet need for generating carbon from waste materials utilizing simpler approaches and in such a way that carbon produced is suitable for use in making anodes suitable for electrochemical cells and other applications.

SUMMARY

A method of producing a sulfonated polymer is disclosed. The method includes providing a source for a quantity of a polymer, wherein the quantity of the polymer has a shape. The quantity of the polymer is heated while immersed in sulfuric acid to a temperature in the range of 100-200° C. for a period time in a closed reactor containing an atmosphere, wherein the reactor is capable of holding pressure generated by a reaction between the quantity of the polymer and the sulfuric acid resulting in a sulfonated polymer, wherein substantially all the quantity of the polymer from the source is converted into sulfonated polymer. The sulfonated polymer is then removed from the reactor and dried.

An electrode suitable for use as an electrode in an electrochemical energy storage cell is disclosed. The electrode contains amorphous porous carbon sheets made from a sulfonated polymer with a morphology wherein the amorphous porous carbon sheets have the morphology of the sulfonated polymer from which they are made.

BRIEF DESCRIPTION OF THE FIGURES

Some of the figures shown herein may include dimensions. Further, some of the figures shown herein may have been created from scaled drawings or from photographs that are scalable. It is understood that such dimensions or the relative scaling within a figure are by way of example, and not to be construed as limiting. It should be recognized that all the figures shown are not to scale.

FIG. 2A shows SEM image indicating the morphology of free-standing carbon sheets architecture with porosity.

FIG. 2B shows SEM image indicating the morphology of free-standing carbon flakes architecture with porosity.

FIG. 2C shows SEM image of carbonaceous material derived from HDPE-S.

FIGS. 2D through 2H shows elemental mapping for the SEM image of FIG. 2C indicating presence of carbon, sulfur remaining form the reaction, magnesium, aluminum, and oxygen respectively.

FIG. 3A shows Raman spectra of as-received LDPE, after solvothermal synthesis (LDPE-S) followed by carbonization (LDPE-C) process.

FIG. 3B shows Raman spectra of as-received HDPE, after solvothermal synthesis (HDPE-S) followed by carbonization (HDPE-C) process.

DETAILED DESCRIPTION

Figure 1A:
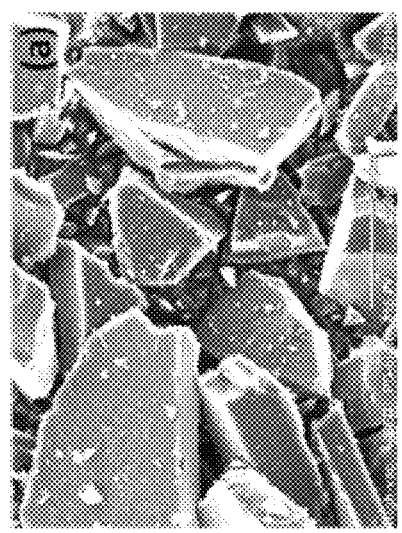
FIG. 1A shows SEM image indicating the morphology of free-standing carbon sheets architecture.
Figure 1B:
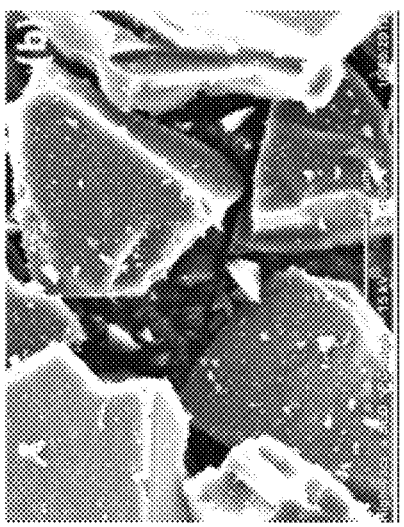
FIG. 1B SEM image indicating the morphology of free-standing carbon flakes architecture.
Figure 1C:
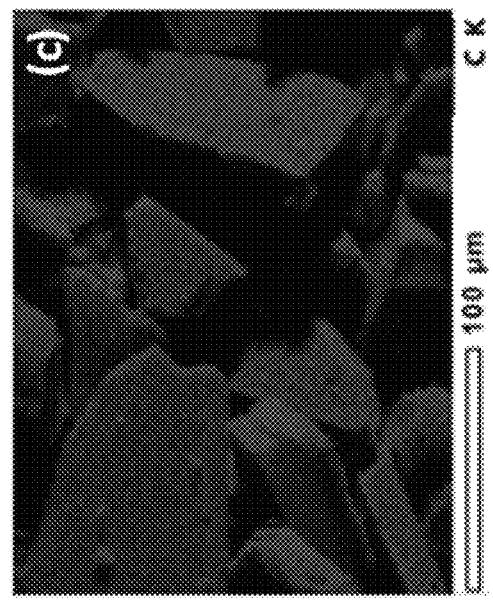
FIG. 1C shows SEM image elemental mapping analysis of carbon sheets of FIG. 1A for the presence of carbon.
Figure 1D:
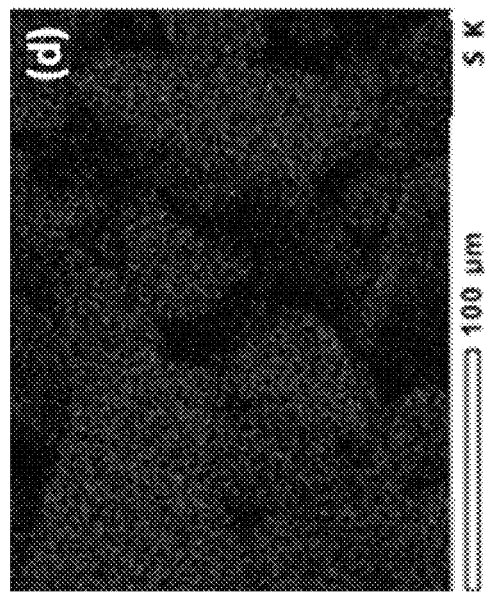
FIG. 1D shows SEM image elemental mapping analysis of carbon sheets of FIG. 1B for the presence of carbon.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This disclosure describes remediation processes capable of producing high-value functional material from low cost or valueless waste feedstock. For purposes of this disclosure the process of producing higher-value materials from lower-value starting materials is termed "upcycling". While recycling processes generally result in lower value than the starting materials, upcycling process results in higher value for the materials made from the lower-value starting material. This disclosure demonstrates an innovative solvothermal (meaning solvent is used and thermal treatment is applied) approach to effectively react sulfuric acid on polyethylene (PE) chains modifying the PE at moderate temperature. In this process, polymer undergoes a cross-linking step above 120° C., while above 500° C. it transforms into turbostratic (disordered) carbon structures. Scanning electron micrographs confirmed free-standing carbon sheets architectures derived from the solvothermal processing of waste plastic bags. Raman spectroscopy and X-ray diffraction verified amorphous/disordered $sp^2/sp^3$ hybrid carbon structure in produced carbons. High BET surface areas of 752.3 and 673.5 $m^2$/g for low-density polyethylene derived carbon (LDPE-C), and high-density polyethylene derived carbon (HDPE-C), respectively were obtained. TGA analysis established a total mass retention of 50% and 46% for LDPE and HDPE respectively, from sulfonated materials. Li-ion battery composite anode comprising LDPE-C, and HDPE-C with binder, and carbon additive (vs Lithium) produced 230 mAh/g and 350 mAh/g specific capacities for LDPE-C and HDPE-C, respectively when cycled at room temperature at C/5 rate. Elevated temperature (50° C.) battery cycling produced 290 mAh/g and 440 mAh/g specific capacities for LDPE-C, and HDPE-C, respectively at C/5 rate. This disclosure demonstrates that solvothermal sulfonation process followed by thermal treatment successfully converts waste LDPE, and HDPE plastic bags to functional energy storing carbons.

Synthesis of Sulfonated Polyethylenes: In experiments leading to this disclosure, low-density and high-density polyethylene bags (LDPE, and HDPE, respectively) were obtained from Ziploc and HILEX, respectively. After their general household usage, they are used as a feedstock in the solvothermal process of this disclosure. The 98% concentrated $H_2SO_4$ was used as received from BDH.

In the experiments, typically 1 g of LDPE or HDPE was immersed in 20 mL of sulfuric acid ($H_2SO_4$) in a 120 mL capacity Teflon vessel with Teflon cap. Therefore, due to the dominant sulfuric acid component, we define our process as solvothermal and not hydrothermal. Sulfuric acid is known to be a powerful protonating agent, oxidizing agent, and dehydrating agent (remove or replace molecules from organic compounds). The PE/acid loaded Teflon vessel was inserted into a solvothermal Parr reactor and heated to 110° C. for 12 hours followed by natural cooling to room temperature. Typically, waste solid polyethylene (PE) thermally melts at 115-135° C., above which it transforms into hazardous gases ($CO_2$, CO, $H_2O$, and $C_xH_y$) without converting into valuable carbon product. To achieve carbonaceous materials, it is essential to transform some H atoms of polyethylene chains to $SO_3H$ groups. After opening the reactor, the black sheets and flakes obtained were washed with deionized water several times removing unreacted acid. It should be realized that the obtained carbonaceous mass contains sheets and/or flakes or sheets comprising flakes. The obtained sulfonated sheets and/or flakes were dried overnight at 80° C., and are named as LDPE-S and HDPE-S, depending on the source. That is, in this disclosure, carbonaceous mass containing carbon sheets/flakes derived from LDPE is named LDPE-S; and, carbonaceous mass containing carbon sheets/flakes derived from HDPE is named HDPE-S. After solvothermal synthesis, both sulfonated materials (LDPE-S and HDPE-S) increase their masses by 28±6% and 23±9%, respectively. The carbon sheets produced retain the shape or morphology of the precursor polymer, which was made to interact with the sulfuric acid at elevated temperatures such as 500° C. with self-generated pressure (meaning due to the reaction between the acid and the precursor polymer). In this disclosure the words "shape" and "morphology" are used synonymously.

The production of carbon fiber is very similar to carbon chips. Only the difference is we commercially available polyethylene (PE) fibers (instead of PE bags) are used as precursor. The PE fibers with diameter ranging from 10 micrometer to 100 micrometers were used instead of PE bag as a polymeric precursor. For purposes of this disclosure fibers are also termed one-dimensional fibers. For all practical purposes, these fibers are nearly circular in diameter and can be of any length. For purposes of this disclosure the fiber diameter can vary between 0.1 and 900 micrometers For purposes of this disclosure the aspect ratio of a piece of fiber can range from 2 to 5000.

To produce carbon fibers, typically 1 g of PE Fibers were immersed in 20 mL of sulfuric acid ($H_2SO_4$) in a 120 mL capacity Teflon vessel with Teflon cap as solvothermal process. Sulfuric acid is a powerful protonating agent, oxidizing agent, and dehydrating agent (remove or replace molecules from organic compounds). The PE fiber/acid loaded Teflon vessel was inserted into a solvothermal Parr reactor and heated to 110° C. for 12 hours followed by natural cooling to room temperature. Typically, PE fibers thermally melts at 115-135° C., above which it transforms into hazardous gases (CO2, CO, H2O, and CxHy) without converting into valuable carbon fiber product. To achieve carbonaceous materials, it is essential to transform some H atoms of polyethylene fiber chains to SO3H groups. After opening the reactor, the black carbon fibers were obtained, washed with deionized water several times removing unreacted acid. It should be realized that the obtained carbonaceous mass contains fiber like morphology analogous to precursor PE fiber with small amount shrinkage in width. The obtained sulfonated fibers were dried overnight at 80° C., and named as carbon fibers.

Figure 10B:
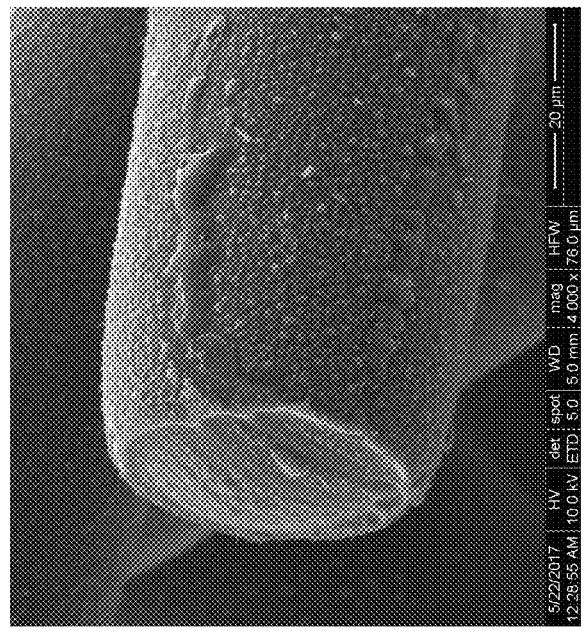
FIG. 10B shows SEM micrograph showing the solid nature of the carbon fibers of FIG. 10A.
Figure 10A:
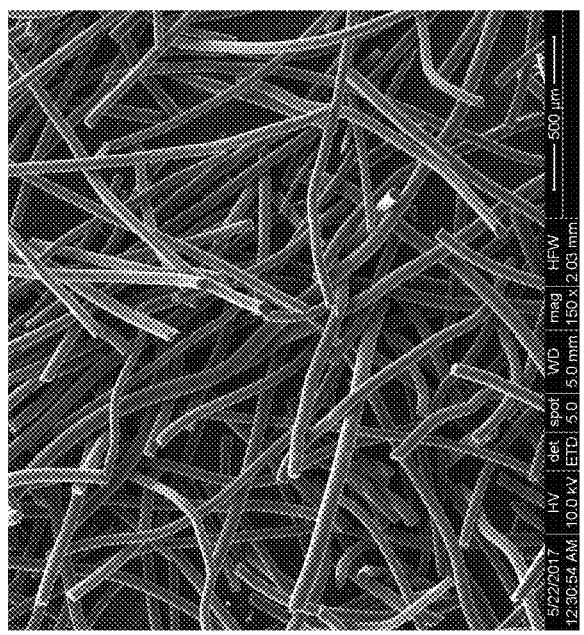
FIG. 10A shows SEM micrograph of carbon fibers produced from polyethylene fibers with sulfuric acid solvothermal reaction at 110° C. for 12 hours followed by 700° C. pyrolysis in inert atmosphere possesses diameter less than 100 μm.

Carbon fibers produced from polyethylene fibers with sulfuric acid solvothermal reaction at 110° C. for 12 hours followed by 700° C. pyrolysis in inert atmosphere possessed diameters less than 100 μm as shown in FIG. 10A by way of an SEM micrograph. The solid nature of the carbon fibers of FIG. 10A is shown in FIG. 10B by way of an SEM micrograph.

Figure 10D:
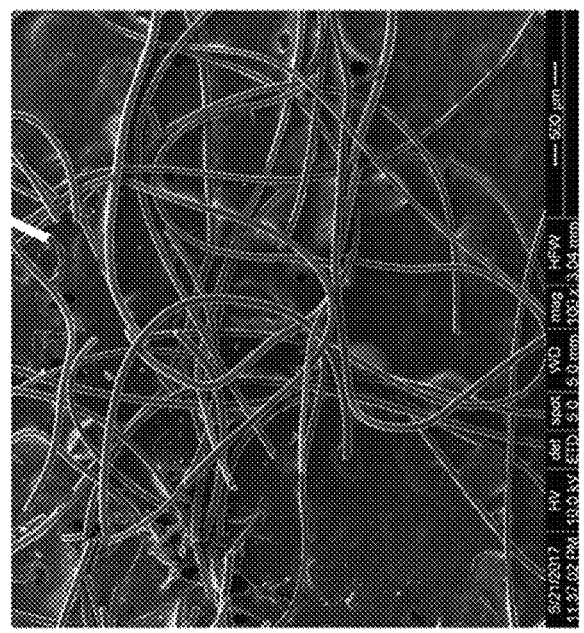
FIG. 10D is an SEM micrograph showing solid nature of the carbon fibers of FIG. 10C.
Figure 10C:
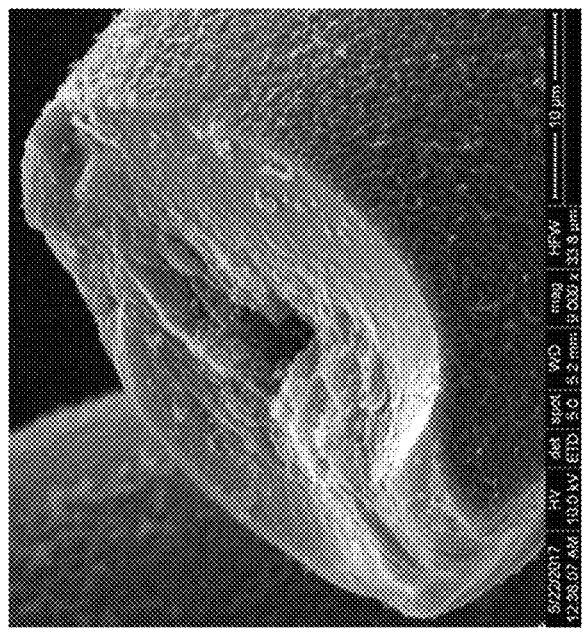
FIG. 10C shows SEM micrograph showing carbon fibers produced from polyethylene fibers with sulfuric acid solvothermal reaction at 110° C. for 12 hours followed by 900° C. pyrolysis in inert atmosphere possesses diameter less than 100 μm.

Carbon fibers produced from polyethylene fibers with sulfuric acid solvothermal reaction at 110° C. for 12 hours followed by 900° C. pyrolysis in inert atmosphere possesses diameter less than 100 μm as shown in FIG. 10C by way of an SEM micrograph. The solid nature of the carbon fibers of FIG. 10C is shown in FIG. 10D by way of an SEM micrograph.

In the cases described above, the carbon fibers maintained their one-dimensional architecture even after pyrolyzing at 700 or 900° C.

Carbonization of Sulfonated Polyethylenes: In a tubular split furnace, LDPE-S or HDPE-S were separately carbonized for 2 hours in an alumina crucible inside quartz tube under Ar-flow (200 mL min$^{-1}$) at 900° C. The heating and cooling rates were used as 10° C./min. The exit of the tube furnace was connected to a water trap, which collected formed byproducts during carbonization process of sulfonated flakes. Sample yields of carbon products were weighted after carbonization and named as LDPE-C, and HDPE-C, depending on the source. That is, carbon products resulting from carbonization of LDPE-S were named LDPE-C and carbon products resulting from carbonization of HDPE-S were named HDPE-C. These carbonaceous materials were then grounded in an agate mortar to form free flowing carbon black powder. Carbonization shows a total mass yield (PE to carbon conversion) is 63±5% for LDPE and 54±3% for HDPE, respectively.

Characterization: Scanning electron microscopy and elemental mapping were performed by using JEOL Scanning Electron Microscope instrument (JCM-6000PLUS, JED-2300 AnalysisStation). Raman spectra were collected using a Thermo Scientific DXR Raman Microscope with 633 nm laser; a low laser power of 2 mW was used avoiding sample burning/modification. X-ray diffraction patterns were collected using a Riguka SmartLab XRD, operated at 40 kV and 40 mA, with a Cu Kα radiation source (λ=0.154 nm); the samples were measured from 10° to 80° with a scan rate of 2.5° per minute. Surface area analysis of black carbon powders/sheets was measured in a Quantachrome Instruments analyzer after outgassing the materials at 300° C. for 24 hours. Thermogravimetric analysis (TGA) was performed using a thermal analyzer system (i1000, IS Inc.) flowing argon gas (99.997%) at a heating rate of 10° C. min$^{-1}$ from room temperature to 1000° C.

Electrochemical tests: Lithium-ion battery anode electrodes were prepared with 80% of waste polyethylene derived carbons, 10% of polyvinylidene difluoride (KYNAR HSV900, Arkema Inc.) binder and 10% of carbon black additive (TIMCAL Super P Li). Composite slurry was homogenized for 20 min employing a Thinky planetary mixture in presence of 7-8 drops of N-methylpyrrolidone (NMP) at a constant speed of around 8000 revolutions per minute (rpm). Using the Dr. Blade technique, slurries were deposited on a battery-grade copper foil using an MTI laminate coater with approximately 40 micrometers thickness and obtained foils were dried overnight at 80° C. Electrodes of 12 mm diameter were punched out and CR2025-type half-coin cells (MTI Corp) were assembled in a high-purity argon glovebox (NEXUS II Vacuum Atmospheres Co.) with <1 ppm of $O_2$ and moisture. Celgard 2500 polypropylene separator, a lithium metal foil (MTI Corp) as the counter electrode, and an organic electrolyte consisting of 1 M $LiPF_6$ are used. Cyclic voltammetric analysis was carried out for the fabricated lithium cells comprising either LDPE and HDPE derived carbons between 0.005-2.0 V at the scan rate of 0.2 mV s$^{-1}$ employing Gamry 600 potentiostat/galvanostat/ ZRA. Galvanostatic charge-discharge cycling was performed using an Arbin cycler between 0.005-2.0 V with a theoretical capacity of 372 mAh/g used to calculate corresponding C rates (1C=372 mA/g). For the kinetic and cell degradation studies, an elevated temperature charge-discharge cycling was conducted at 50° C. in an ESPEC oven.

Figure 12:
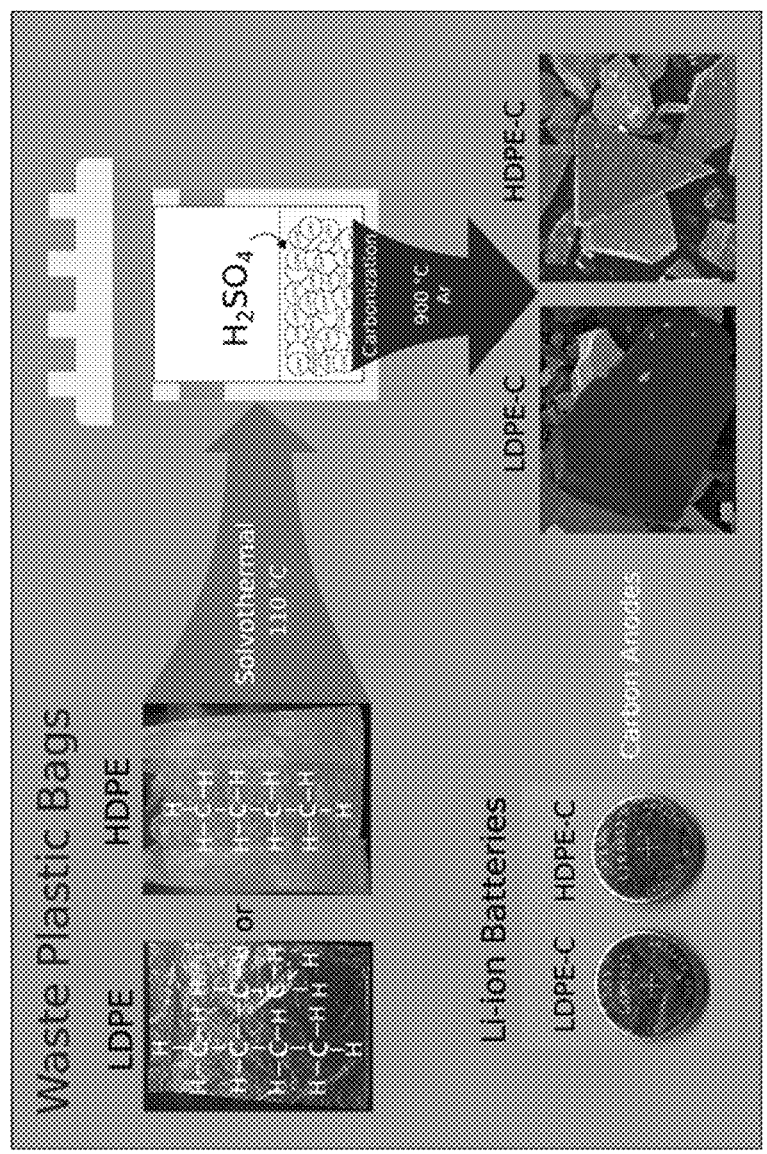
FIG. 12 shows the solvothermal process of this disclosure for the manufacture of carbon chips from the used low and high-density plastic bags, their chips-like morphology and effective use in lithium-ion battery anodes.

FIG. 12 demonstrates the novel solvothermal approach of this disclosure for the fabrication of carbon chips from the used plastic bags and its effective use in lithium-ion battery anodes. Referring to FIG. 12, the chemical formula of PE, solvothermal reactor assembly comprising acid, inert gas treatment at elevated temperature, chip-like morphology of carbon (artistically decorated) and made coin cells are presented. Typically, polyethylene thermally melts at 115-135° C., above which it transforms into hazardous gases ($CO_2$, CO, $H_2O$ and $C_xH_y$) without converting into valuable carbon product. To methodically achieve carbonaceous materials, an oxidative dehydrogenation accompanied by $SO_3H$ functionalization is carried out in a solvothermal Teflon inner lining reactor. Hydrothermal reaction facilitates $SO_3H$ functionalization. During high-temperature treatment, the removal of sulfonic acid groups takes place followed by crosslinking above 500° C. to remove all remaining —$H_2$, —CO, —$CO_2$, —$H_2O$, or $SO_2$ to yield pure carbon. Finally, lithium-ion coin or button cells are made and Li-ion storage performance was studied. Typically, the large area plastic bags can be converted to sulfonated plastic larger bags followed by carbon bags. After grinding these bags it becomes small 2 dimensional carbon sheets, further grinding yields flakes and long term mechanical mixing turns to micrometer diameter carbon chips. It means that sheets are the large size 2 dimensional entity of carbon chips. LDPE-C is mostly carbon while HDPE-C has impurities (Mg, Al, O etc.) originated from the dyes and paints.

To comprehend the morphology of obtained carbonaceous materials, scanning electron microscopy images and elemental mapping analysis were taken for the LDPE-C and HDPE-C carbon materials as described in FIGS. 1A through 1D and FIGS. 2A through 2H. The larger plastics pieces (both LDPE and HDPE) are converted to carbon pieces, which got fragmented into free-standing carbon sheets/flakes architectures as shown in FIGS. 1A through 1D, and FIGS. 2A through 2C. The particle width of the chips is dependent on the mechanical grinding process to which the sheets/flakes were subjected. Gentle milling of obtained LDPE-C and HDPE-C in an agate mortar with pestle leads to form carbon chips like particles with several microns width. The thickness of the carbon chips is 25.28±4 μm and 11.86±2.4 μm for LDPE-C and HDPE-C, respectively. The thickness is dependent on the initial feedstock precursor (LDPE and HDPE bags) thicknesses. The observed shrinkage in diameter from the feedstock waste plastics to carbon product is approximately 25%. This shrinkage could be explained by the release of molecules (—$H_2$, —CO, —$CO_2$, —$H_2O$, or $SO_2$) during the elevated temperature treatment. Carbon chips prepared from the HDPE yielded more porous carbon structures compared to LDPE, possibly due to the thermochemical reaction with inorganic colorants during the elevated temperature heat treatment. Furthermore, the presence of carbon and trace amount of sulfur is measured in the LDPE-C carbon material as described in FIGS. 1C and 1D. In HDPE, trace amount of colorants are present that lead to additional impurities, revealed in the XRD (FIG. 4B) and elemental mapping (FIG. 2D through 2H) for the obtained carbon product. As seen in FIG. 2C, carbon obtained from HDPE which includes both flakes and sheets, possesses more than 90% of carbon (FIG. 2D), sulfur remaining after carbonization (FIG. 2E), Mg (FIG. 2F), Al (FIG. 2G) and O (FIG. 2H). The presence of colorants impurities are consistent with the X-ray diffraction HDPE-C (FIG. 4C).

Amorphous/ turbostratic nature of LDPE-C and HDPE-C was analyzed by Raman spectroscopy and X-ray diffraction (XRD) patterns. FIGS. 3A and 3B depict Raman spectra of LDPE and HDPE and its derivative materials. LDPE bags shows Raman bands at 1067, 1132, 1299, 1441, 1455, and 1465 $cm^{-1}$ corresponding to different behaviors, such as bending, twisting and stretching of $CH_2$. HDPE has shown different Raman bands due to additional components/impurities such as pigments of different colors. A strong peak at 1580 $cm^{-1}$ of LDPE-S and HDPE-S is indicative of the crosslinking and aromatization during the solvothermal synthesis. LDPE-C and HDPE-C confirm disordered carbon nature from PE plastic bags showing peaks at 1350 and 1580 $cm^{-1}$ that relates to the D (disorder) and G (graphitic) bands. Raman spectroscopy studies confirm the transformation of plastic bags into carbonaceous materials during solvothermal processing followed by pyrolysis.

Figure 4B:
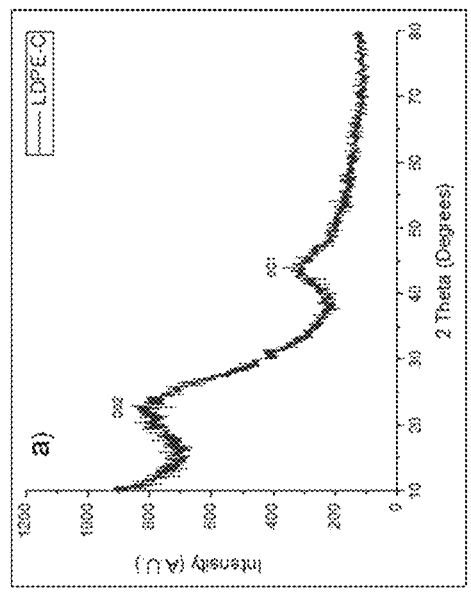
FIGS. 4A and 4B show XRD patterns of carbon chips LDPE-C and HDPE-C respectively, derived from plastic feedstock.
Figure 4A:
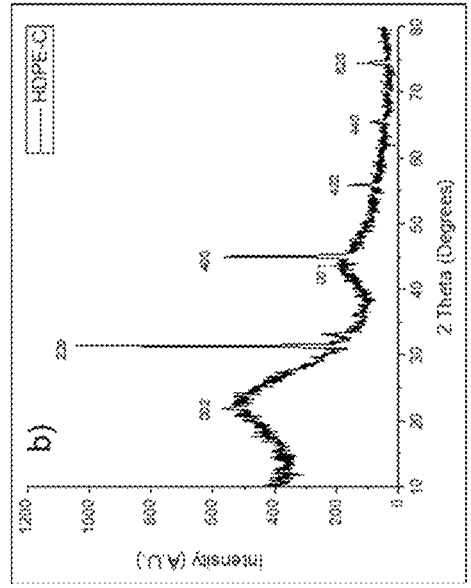

The XRD patterns obtained depicted peaks corresponding to the (002) and (001) Miller turbostratic or amorphous planes of carbon, in LDPE-C (FIG. 4A) and HDPE-C (FIG. 4B). These broad diffraction peaks are indicating amorphous carbon structure. However, HDPE-C has shown strong peaks corresponding to the (220), (400), (422), (440), and (620) Miller planes. These diffraction peaks are analogous to $MgAl_2O_4$ crystal structure. It is known that HDPE could have pigments/colorants that contains MgO and Alumina. With the thermal treatment, these impurities in the raw material converted into $MgAl_2O_4$ structure. So, the derived carbon materials of HDPE-C contains around 10% of $MgAl_2O_4$. These colorants impurities are observed in SEM-EDS (FIG. 2 c-h) as well as TGA measurements (FIG. 6).

Figure 5A:
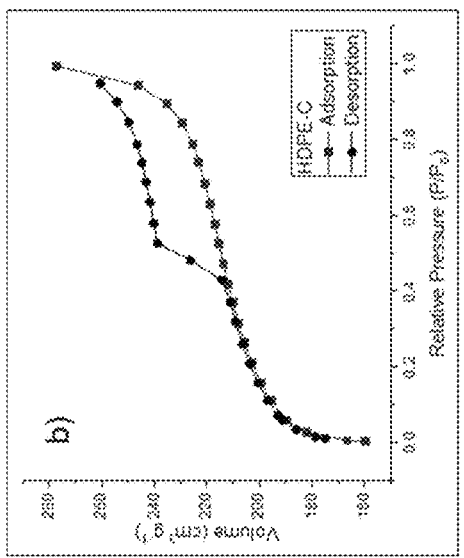
FIGS. 5A and 5B show $N_2$ adsorption-desorption isotherms of LDPE-C and HDPE-C, respectively.
Figure 5C:
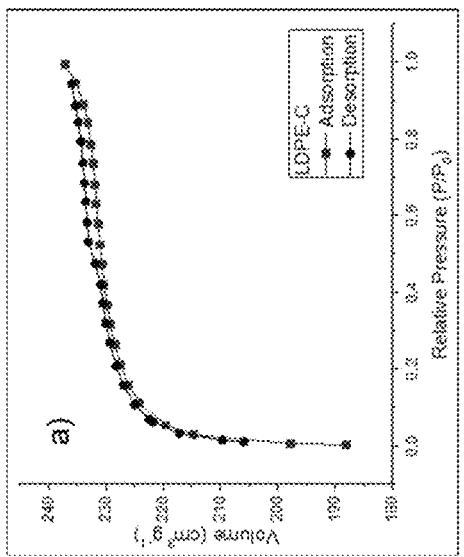
FIGS. 5C and 5D B show the DFT pore size distribution and pore volume for LDPE-C and HDPE-C, respectively.
Figure 5B:
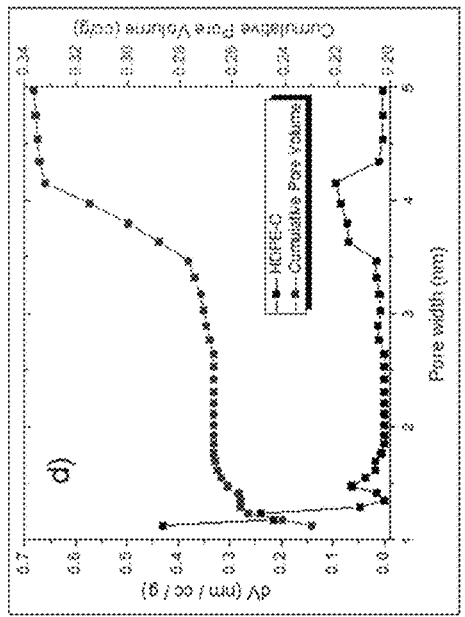
Figure 5D:
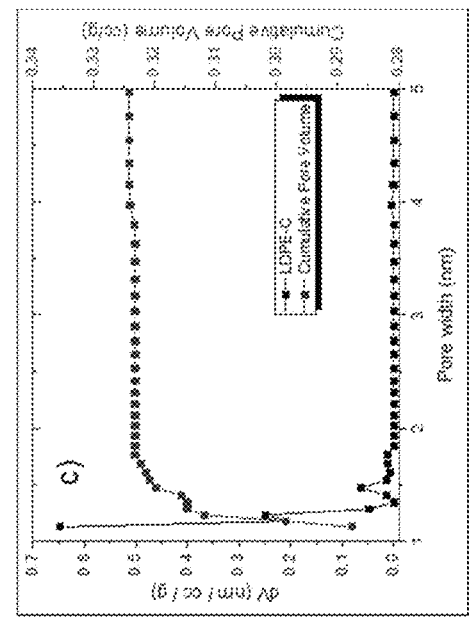

Additional detailed characterization of carbon chips was performed through $N_2$ adsorption and desorption isotherms of LDPE-C (FIG. 5A) and HDPE-C (FIG. 5B). These curves reveal behavior of $H_3$ isotherm (IUPAC classification) for both the sample. HDPE-C compared with LDPE-C shows high hysteresis suggesting the existence of macropores. SEM images in HDPE-C shows macropores, possibly generated due to the thermochemical reaction of colorant impurities with HDPE during pyrolysis treatment. The decrease in surface area is also a result of the contaminant present in the HDPE as shown in Table 1 below. DFT pore size distribution is shown for LDPE-C (FIG. 5c) and HDPE (FIG. 5d). In addition to the pores at around 1.5 nm, in HDPE-C 4 nm pores are also observed possibly due to the contribution from the inorganic contaminants.

TABLE 1

BET surface area and DFT pore volume of the carbons derived from LDPE-C and HDPE-C.

| Sample | BET surface area ($m^2$/g) | DFT pore volume (cc/g) | Mean pore width (nm) |
| --- | --- | --- | --- |
| LDPE-C | 752.3 | 0.33 | 1.13 |
| HDPE-C | 673.5 | 0.37 | 1.13 |

Figure 6B:
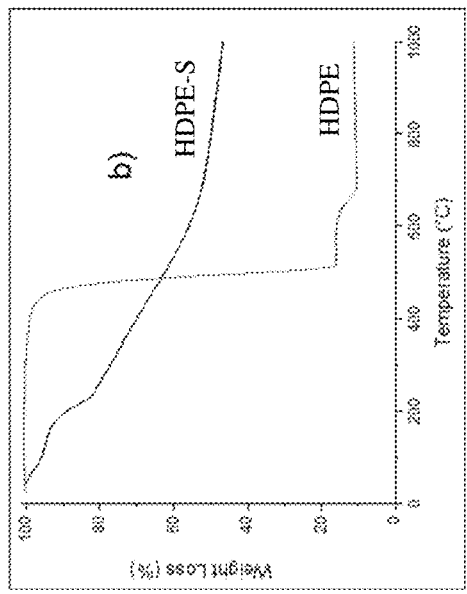
FIG. 6B shows TGA of LDPE and LDPE-S.
Figure 6A:
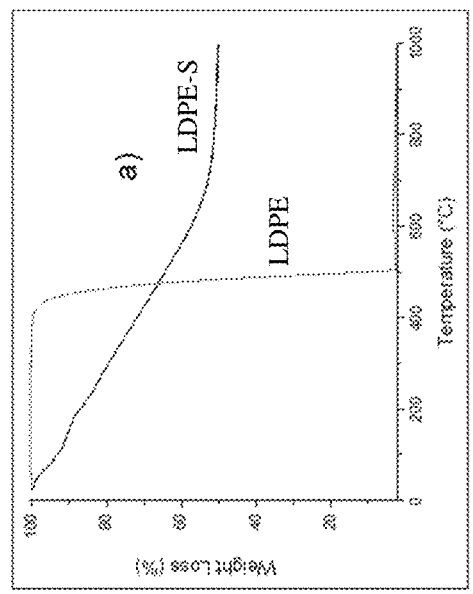
FIG. 6A shows TGA of LDPE and LDPE-S.

Thermogravimetric analysis of feedstock LDPE plastics and solvothermally treated plastics were performed under Argon atmosphere to determinate remaining mass yields. FIG. 6A demonstrates that LDPE starts degrading above 400° C. and completely becomes gaseous phase with no solid mass remaining above 500° C. This confirms that the thermal decomposition of LDPE in an inert atmosphere does not lead to fabricate carbon-based materials. Alternatively, the sulfonated PE starts showing mass loss from the beginning until it reaches to 600° C. This is a result of conversion of cross-linked PE to carbon-based material. Around 50% yield remains after the TGA characterization of LDPE. FIG. 6B presents the TGA of feedstock trashed HDPE and solvothermally sulfonated HDPE. Analogous to LDPE the thermal decomposition of HDPE is observed till 500° C. However, between 500-700° C., additional kink is measured due to inorganic colorants/pigments transformation. Remaining 10 wt % content is the pigments that were detected as $MgAl_2O_4$ in presented XRD pattern (FIG. 4B). However, sulfonated HDPE has analogous behavior to LDPE with additional kink between 100-200° C., as a result of sulfur melting and/or its interactions with inorganic pigments. Continuous loss of sulfur due to its weak bonding with polymers, analogous behavior has been reported in Sulfur/CNT, and Carbon compartment/Sulfur, materials.

Figure 7A:
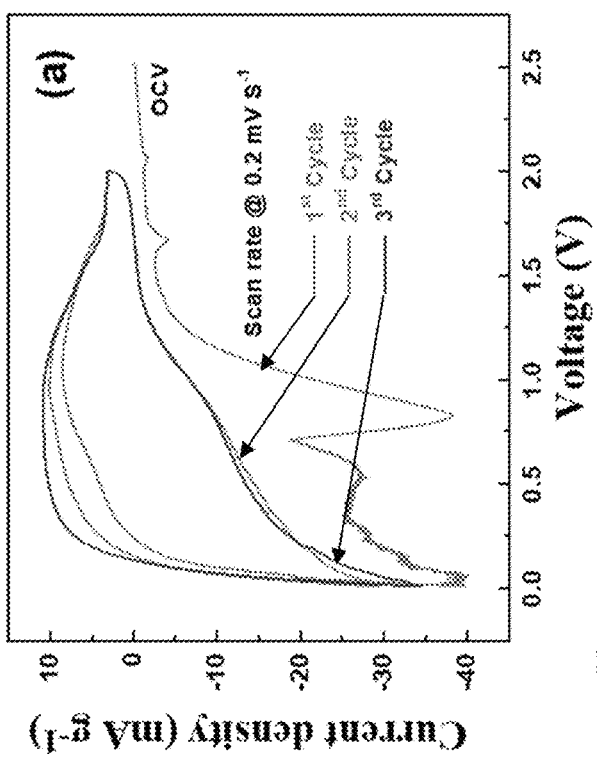
FIG. 7A shows cyclic voltametric analysis of fabricated lithium cells using LDPE-C carbon materials in between 0.005-2.0 V vs $Li^+$/Li at 0.2 mV $s^{-1}$ for first 3 cycles.
Figure 7B:
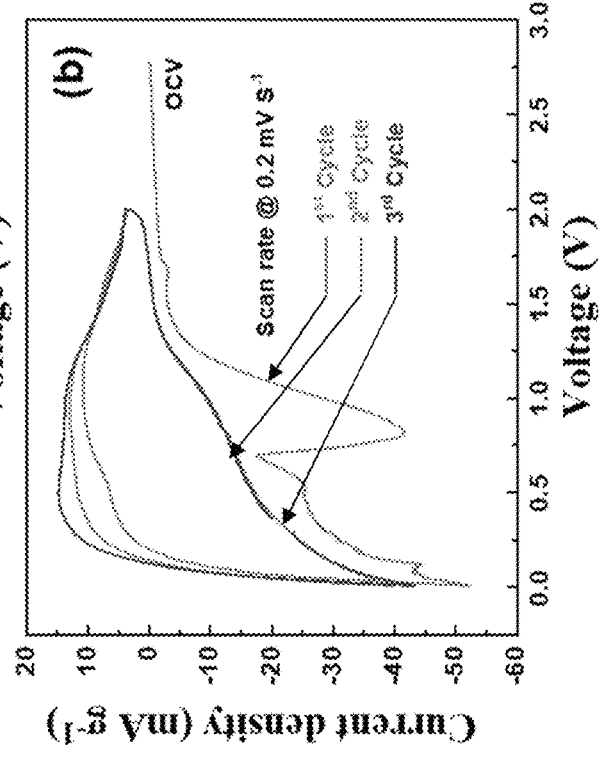
FIG. 7B shows cyclic voltametric analysis of fabricated lithium cells using HDPE-C carbon materials in between 0.005-2.0 V vs $Li^+$/Li at 0.2 mV $s^{-1}$ for first 3 cycles.

To investigate the electrochemical characteristics, the cyclic voltammetric analysis was carried out for the assembled lithium cells comprising LDPE-C and HDPE-C carbon materials in between 0.005–2.0 V vs Li$^+$/Li at the scan rate of 0.2 mV s$^{-1}$ for 3 cycles as shown in FIG. 7A (LDPE-C) and FIG. 7B (HDPE-C). In the 1$^{st}$ cycle of cyclic voltammograms, the significant irreversible redox processes are appeared, which is associated to the solid electrolyte interface formation on the carbon surface, intercalation-deintercalation process and followed by the capacitive ionization/deionization and adsorption/desorption processes in lined with the electromotive force. The obtained strong reduction peak is at 0.8 V related to solid electrolyte interface formation during the first lithiation on the carbon surface of LDPE-C and HDPE-C carbon materials. Obviously, it can be seen that the Li$^+$ ion storage is occurring by the capacitive ionization/ deionization and adsorption/desorption processes on the carbon surface that leads to the cyclic voltammograms with wide hysteresis. In addition to this phenomena, the Li-ion intercalation-deintercalation process is taking place during cycling in the short-range order amorphous carbon.

Figure 8B:
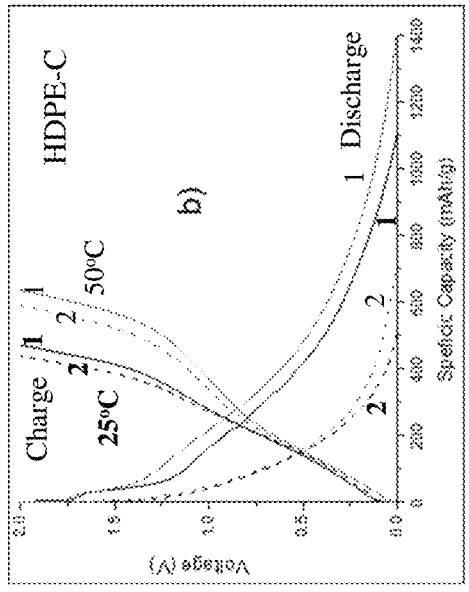
FIGS. 8A and 8B show Room (25° C.) and Elevated temperature (50° C.) voltage profiles of LDPE derived C and HDPE derived C, respectively obtained at C/10 rate (1C=372 mA/g current density).
Figure 8D:
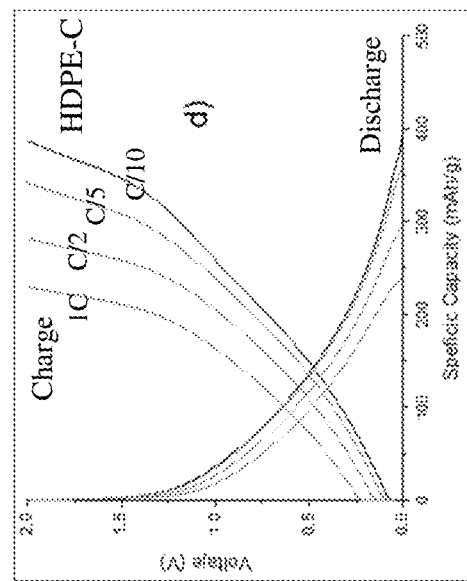
FIGS. 8C and 8D show Room temperature voltage profiles using various current densities for LDPE-C and HDPE-C samples, respectively.
Figure 8A:
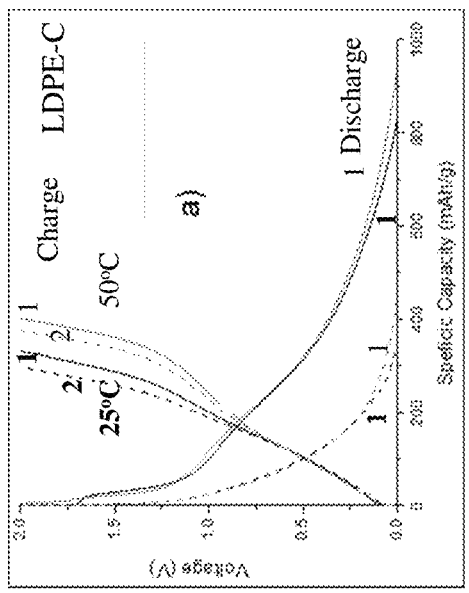

FIGS. 8A and 8B show the first and second discharge (lithiation) and charge (delithiation) curves for LDPE-C and HDPE-C samples, respectively. First cycle capacity losses of 40% and 43% (25 and 50° C., respectively) for LDPE-C sample with higher lithiation/delithiation potential is evident. Analogous 43% and 45% (25 and 50° C., respectively) capacity losses in HDPE-C are also noticed, reflecting significant SEI formation. This loss is associated to electrolyte breakdown forming solid electrolyte interphase (SEI) on larger surface area carbon chips with irreversible adsorption of Li at surface defects and surface-attached O or S atoms. The decrease in the charge-discharge potentials during second cycle is an outcome of stable SEI formation and its stabilization on later cycles. The recorded specific capacities is slightly enhanced than the theoretical (372 mAh/g) capacity of graphite in LDPE derived carbon sample. HDPE derived carbon yields improved capacities compare to LDPE derived carbons because of additional inorganic impurities, which participated in the electrochemical redox or alloying reactions.

Figure 8C:
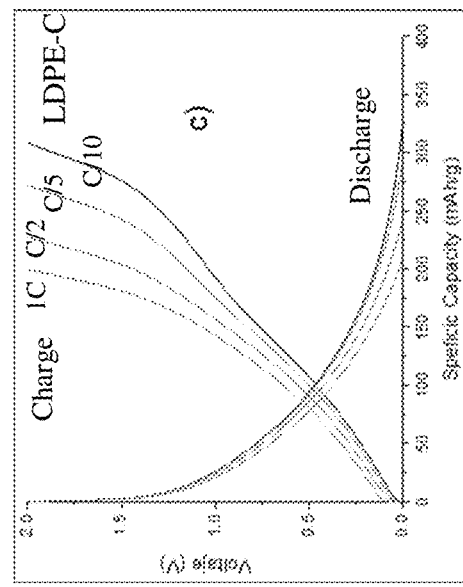

The room temperature voltage profiles for LDPE-C and HDPE-C electrodes cycled at various currents are shown in FIGS. 8C and 8D, respectively. Both LDPE-C and HDPE-C has shown similar behavior in the first two cycles. Even at 1C high current density, the charge and discharge capacities are greater than 200 mAh/g, due to the shorter diffusion distance in carbon chips. For standard graphitic materials, typically the anode particle size is 10-20 µm requiring additional time for charging or discharging.

Figure 9A:
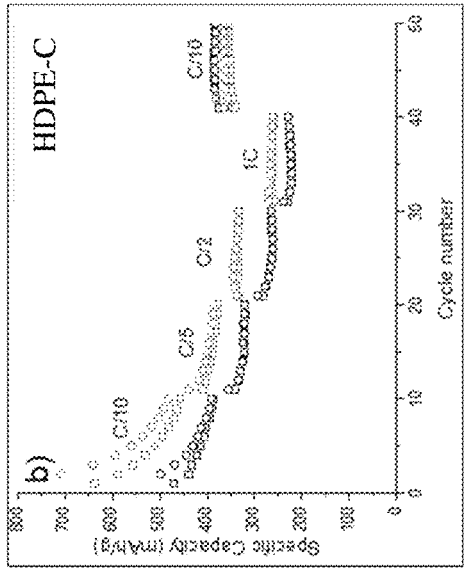
FIGS. 9A and 9B show rate performance at 4 different currents for LDPE-C and HDPE-C, respectively at 25 and 50° C.
Figure 9B:
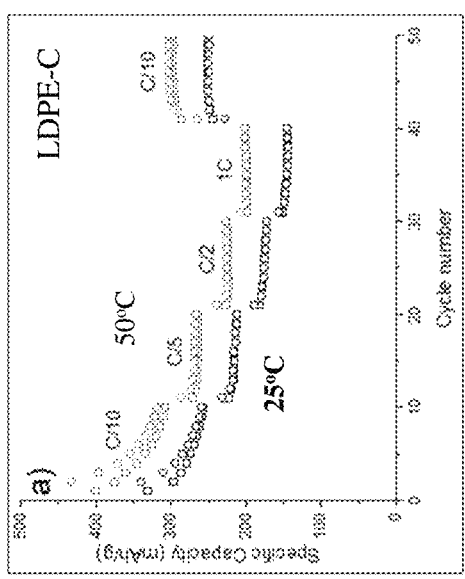
Figure 9C:
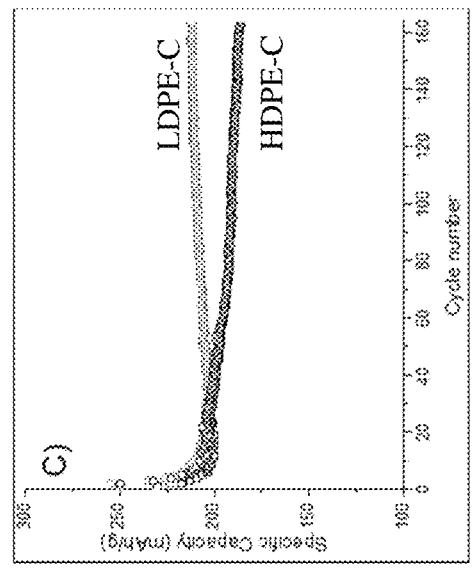
FIG. 9C shows long-term cycling using C/5 rate for LDPE-C and HDPE-C at 25° C.

FIGS. 9A through 9C summarize the galvanostatic cycling results of LDPE-C and HDPE-C anodes. FIGS. 9A and 9B show rate studies performed utilizing various current densities, yielding reversible capacities of 230 and 290 mAh/g (25 and 50° C., respectively for LDPE-C).

The slight increase in capacity, 350 and 440 mAh/g (25 and 50° C., respectively for HDPE-C) is recorded at C/5 rate. At 1C rate (i.e. one hour charging and one hour discharging), the capacity drops to 160 and 210 mAh/g (25 and 50° C., respectively for LDPE-C), and 240 and 270 mAh/g (25 and 50° C., respectively for HDPE-C). Long cycle stability of the carbon sample was studied through a cycling rate of C/5 rate (FIG. 9c). After initial 20 cycles, a stable reversible capacity of 200 mAh/g is achieved for both LDPE-C and HDPE-C.

Carbon fibers produced from polyethylene fibers with sulfuric acid solvothermal reaction at 110° C. for 12 hours followed by 700° C. pyrolysis in inert atmosphere possessed diameters less than 100 µm as shown in FIG. 10A by way of an SEM micrograph. The solid nature of the carbon fibers of FIG. 10A is shown in FIG. 10B by way of an SEM micrograph.

Carbon fibers produced from polyethylene fibers with sulfuric acid solvothermal reaction at 110° C. for 12 hours followed by 900° C. pyrolysis in inert atmosphere possesses diameter less than 100 µm as shown in FIG. 10C by way of an SEM micrograph. The solid nature of the carbon fibers of FIG. 10C is shown in FIG. 10D by way of an SEM micrograph.

In the cases described above, the carbon fibers maintained their one-dimensional architecture even after pyrolyzing at 700 or 900° C.

Figure 11B:
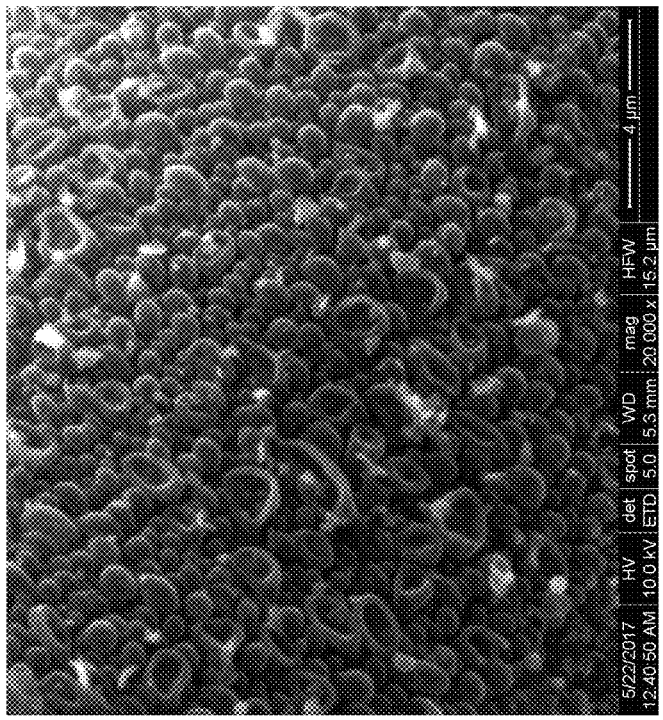
FIG. 11B shows SEM micrograph of carbon fibers produced at 900° C. showing carbon bubbles with less 2 μm diameter (donut like structure) on the surface.
Figure 11A:
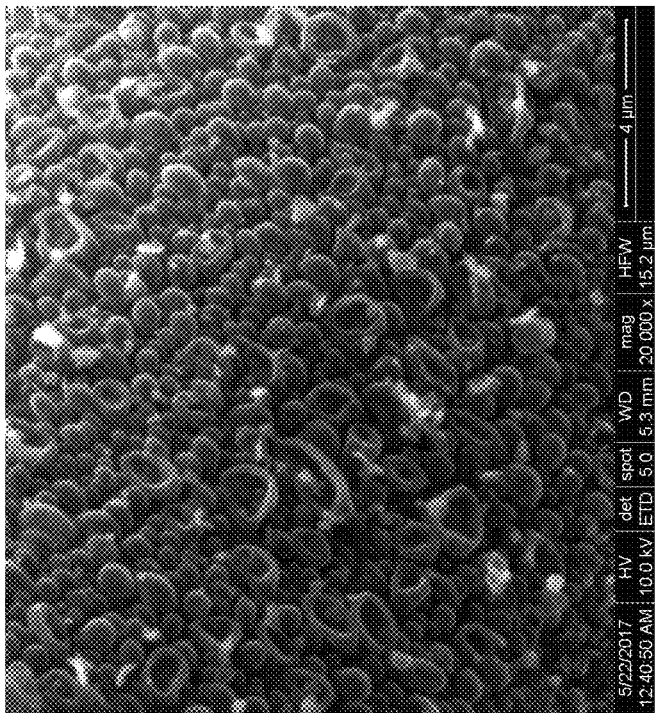
FIG. 11A shows SEM micrograph of carbon fibers produced at 700° C. showing carbon pillar like structure with 1 μm diameter on the surface.

It should be noted that carbon fibers produced at 700° C. or 900° C. do not possess smooth surfaces. carbon fibers produced at 700° C. shows carbon pillar like structure with 1 µm diameter on the surface (FIG. 11A). Carbon fibers produced at 900° C. shows carbon bubbles (donut like structure) on the surface (FIG. 11B). The roughness of these carbon fibers produced at 700° C. or 900° C. ranges from 01 micrometer to 1.0 micrometer.

Thus, it can be seen that the innovative solvothermal upcycling approach described in this disclosure generates high pressure at low temperature, which improves PE sulfonation reproducibly with high carbon yield. The solvothermal upcycling approach of this disclosure totally gets rid of plastic waste converting them into functional carbonaceous materials for multiple applications including battery anodes.

Based on the above description, it is an objective of this disclosure to describe a method of producing a sulfonated polymer. The method includes providing a source for a quantity of a polymer, wherein the quantity of the polymer contains polymer fibers (also termed one-dimensional structures). In this disclosure, the words "shape" and "morphology" are used synonymously. The quantity of the polymer is immersed in sulfuric acid and then heated to a temperature in the range of 100-200° C. for a period of time in a closed reactor containing an atmosphere, wherein the reactor is capable of holding pressure generated by a reaction between the quantity of the polymer and the sulfuric acid resulting in a sulfonated polymer, wherein substantially all the quantity of the polymer from the source is converted into sulfonated polymer. The sulfonated polymer is then removed from the reactor and dried. A non-limiting range for the pressure generated from the above reaction is in 10-200 Mpa. A non-limiting range for the period of time in the above method is 1 minute to 20 hours. In some embodiments of the method, an additional step can be performed, whereby the sulfonated polymer results in amorphous porous carbon, retaining the morphology of the sulfonated polymer. In one embodiment of the method making the porous carbon from the sulfonated polymer, the sulfonated polymer contains polymer fibers, or the polymer morphology is fibers and the amorphous porous carbon formed is in the form of amorphous porous carbon fibers. It should be recognized that in making the porous carbon, the shape of the quantity of the polymer is retained in the sulfonated polymer and the volume shrinkage of the source of the polymer during conversion to carbon via the sulfonated polymer is in the range of 5-25%. The shrinkage is due to release of C—H groups and C—O, S—O groups at high temperatures such as 500° C.

In some embodiments of the method resulting in carbon fibers the porous carbon sfibers have a diameter in the non-limiting range of 0.1-900 micrometers. In some embodiments of the method resulting in carbon fibers, the porous carbon fibers have a surface area in the range of 10 $m^2$/g-1000 $m^2$/g.

In some embodiments of the above method, the polymer is LDPE or HDPE or a mixture thereof. In some embodiments of the method these polymers or mixture can be fragmented. A non-limiting size for these fragments is one or less in any dimension. Such fragmentation can be achieved, for example, by use of scissors. Such fragmentation helps in improving the interaction of the polymer with the acid in the methods described above.

It should be recognized that the method is not limited to LDPE and HDPE. Other polymers can also be subjected to the methods of this disclosure to successfully produce sulfonated polymers and carbonaceous matter, such as carbon chips, carbon sheets etc. can be derived from those sulfonated polymers. Electrodes can be advantageously made from these carbonaceous materials and electrochemical storage cells utilizing those anodes are possible. Polymers suitable for the purpose include but not limited to polyethylene terephthalate (PET), polypropylene (PP), polystyrene (PS), polyethylene oxide, Nylon 6.

In some embodiments of the method, the source for the quantity fop polymer can be waste polymer bags. In some embodiments of the method, the polymer can contain colorants and pigments such as bit not limited to, dyes, colors comprising organic materials containing C, H, and O and/or comprising inorganic materials such as, but not limited to $TiO_2$, $Al_2O_3$, MgO, $Fe_3O_4$, ZnO and/or containing elements such as but not limited to Cd, Cr, Cu, Co containing materials).

It is another objective of this disclosure to describe an electrode suitable for use as an electrode in an electrochemical energy storage cell, wherein the electrode contains carbon made from the carbon sheets made as described above. In some embodiments, the carbon electrode of this disclosure has a specific capacity in the range of 200-600 mAh/g.

It is yet another objective of this disclosure to describe an electrochemical energy storage cell utilizing the carbon electrode of this disclosure described above. In some embodiments of the electrochemical energy's storage cell of this disclosure, the electrochemical storage energy cell is a lithium-ion battery.

While this disclosure illustrated the use of carbine fibers of this disclosure in anodes of electrochemical cells, other applications for the carbon fibers of this disclosure exist. As anon-limiting example, these carbon fibers can be used as strengthening component in many matrix materials for mechanical and structural applications.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A method of producing a sulfonated polymer, the method comprising:
providing a source for a quantity of a polymer, wherein the quantity of the polymer contains fibers of the polymer;
heating the quantity of the polymer immersed in sulfuric acid to a temperature in the range of 100-200° C. for a period time in a closed reactor containing an atmosphere, wherein the reactor is capable of holding pressure generated by a reaction between the quantity of the polymer and the sulfuric acid resulting in a sulfonated polymer, wherein substantially all the quantity of the polymer from the source is converted into sulfonated polymer;
removing the sulfonated polymer from the reactor; and drying the removed sulfonated polymer.

2. The method of claim 1, wherein the pressure generated from the reaction is in the range of 10-200 MPa.

3. The method of claim 1, wherein the time is in the range of 1 minute to 20 hours.

4. The method of claim 1, further comprising the step of heating the sulfonated polymer to 500-1000° C. in an inert atmosphere, wherein sulfonic groups are converted into gaseous species, resulting in amorphous porous carbon retaining the morphology of the sulfonated polymer.

5. The method of claim 4, wherein the sulfonated polymer contains polymer fibers, and the porous carbon is in the form of porous carbon fibers.

6. The method of claim 5, wherein the porous carbon fibers have a diameter in the range of 0.1-900 micrometers.

7. The method of claim 5, where in the porous carbon fibers have a surface area in the range of 10 $m^2$/g-1000 $m^2$/g.

8. The method claim 4, wherein the shape of the quantity of the polymer is retained in the sulfonated polymer and the volume shrinkage of the source of the polymer during conversion to carbon via the sulfonated polymer is in the range of 5-25%.

9. The method of claim 1, wherein the polymer is a low-density polyethylene or high-density polyethylene or their mixture.

10. The method of claim 1, wherein the source is waste polymer bags.

11. The method of claim 1, wherein the polymer is a low-density polyethylene or high density polyethylene.

12. The method of claim 1, wherein the polymer contains colorants and pigments.

13. The method of claim 4, wherein the source is waste polymer bags.

14. The method of claim 1, wherein the polymer is a new low-density polyethylene or a high-density polyethylene fragmented into pieces wherein each piece has a length of one e inch or less in any dimension.

15. The methods of claim 4, wherein the polymer is a low-density polyethylene or a high-density polyethylene fragmented into pieces wherein each piece has a length of one inch or less in any dimension.

16. An electrode suitable for use as an electrode in an electrochemical energy storage cell, wherein the electrode contains amorphous porous carbon fibers made from a sulfonated polymer with a morphology wherein the amorphous porous and having the morphology of the sulfonated polymer from which the porous carbon fibers are made.

17. The electrode of claim 16, wherein the electrode in lithium-ion battery has a specific capacity of energy storage in the range of 200-600 mAh/g.

18. An electrochemical energy storage cell comprising the electrode of claim 17.

19. An electrochemical energy storage cell comprising the electrode of claim 18.

20. The electrochemical energy storage cell of claim 19, wherein the electrochemical storage energy cell is a lithium-ion battery.

21. Carbon fibers of aspect ratio in the range of 2-5000 and diameters in the range of 0.1-900 micrometers possessing a surface roughness in the range of 0.1-1.0 micrometer and having a donut shape on a surface.

* * * * *